United States Patent
Louchard

(10) Patent No.: US 10,473,429 B1
(45) Date of Patent: Nov. 12, 2019

(54) PROJECTILE DETECTION SYSTEM AND METHOD

(71) Applicant: BAE SYSTEMS Information and Electronic Systems Integration Inc., Nashua, NH (US)

(72) Inventor: Eric M. Louchard, Miami, FL (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/106,513

(22) Filed: Aug. 21, 2018

(51) Int. Cl.
*G06K 9/00* (2006.01)
*F41G 3/00* (2006.01)

(52) U.S. Cl.
CPC .................. *F41G 3/00* (2013.01); *G06K 9/00* (2013.01)

(58) Field of Classification Search
CPC .................................. F41G 3/00; G06K 9/00
USPC .................................. 235/411, 404; 382/144
See application file for complete search history.

(56) References Cited

U.S. PATENT DOCUMENTS

| | | | | |
|---|---|---|---|---|
| 2004/0037462 | A1* | 2/2004 | Lewis | G06E 1/02 382/181 |
| 2006/0120621 | A1* | 6/2006 | Larkin | G06K 9/00067 382/280 |
| 2013/0129188 | A1* | 5/2013 | Zhang | G06T 7/0008 382/144 |

OTHER PUBLICATIONS

Aiger and Talbot, "The Phase Only Transform for unsupervised surface defect detection" Conference Paper in Proceedings / CVPR, IEEE Computer Society Conference on Computer Vision and Pattern Recognition. IEEE Computer Society Conference on Computer Vision and Pattern Recognition • Jul. 2010 (Year: 2010).*

(Continued)

*Primary Examiner* — Daniel A Hess
(74) *Attorney, Agent, or Firm* — Finch & Maloney PLLC

(57) ABSTRACT

A projectile detection technique is disclosed. The technique helps improve the self-defense capabilities of strategic platforms such as naval ships against asymmetric threats such as anti-ship missiles (ASMs). These threats can be particularly challenging in a highly cluttered maritime environment, where the threats can be too close for radar to accurately detect. In one example, the projectile detection technique automatically detects ASMs flying above the horizon by using mid-wavelength infrared (MWIR) and visible/near-infrared (VNIR) camera systems, and locating the horizon line and segmenting the imagery into different regions. Projectiles are detected in the near-horizon segment using a Fourier phase-only transform and convolution matched filters to enhance exceedances, then applying multi-frame processing to measure persistence and scintillation (e.g., flicker from missile exhaust) to help filter out background clutter objects. The use of the phase-only transform, matched filters, and multi-frame processing helps detect single-point anomalies and distinguish ASMs from background clutter.

22 Claims, 7 Drawing Sheets

(56) References Cited

OTHER PUBLICATIONS

Canny, John, "A Computational Approach to Edge Detection", IEEE Transactions on Pattern Analysis and Machine Intelligence, Nov. 1986, vol. PAMI-8, Issue: 6, pp. 679-698.

Villeneuve, Pierre V. et al., "Improved Matched-Filter Detection Techniques", Part of the SPIE Conference on Imaging Spectrometry V, SPIE's International Symposium on Optical Science, Engineering, and Instrumentation, Denver, CO, Jul. 1999, Proceedings of SPIE—The International Society for Optical Engineering, Oct. 27, 1999, vol. 3753, pp. 278-285.

* cited by examiner

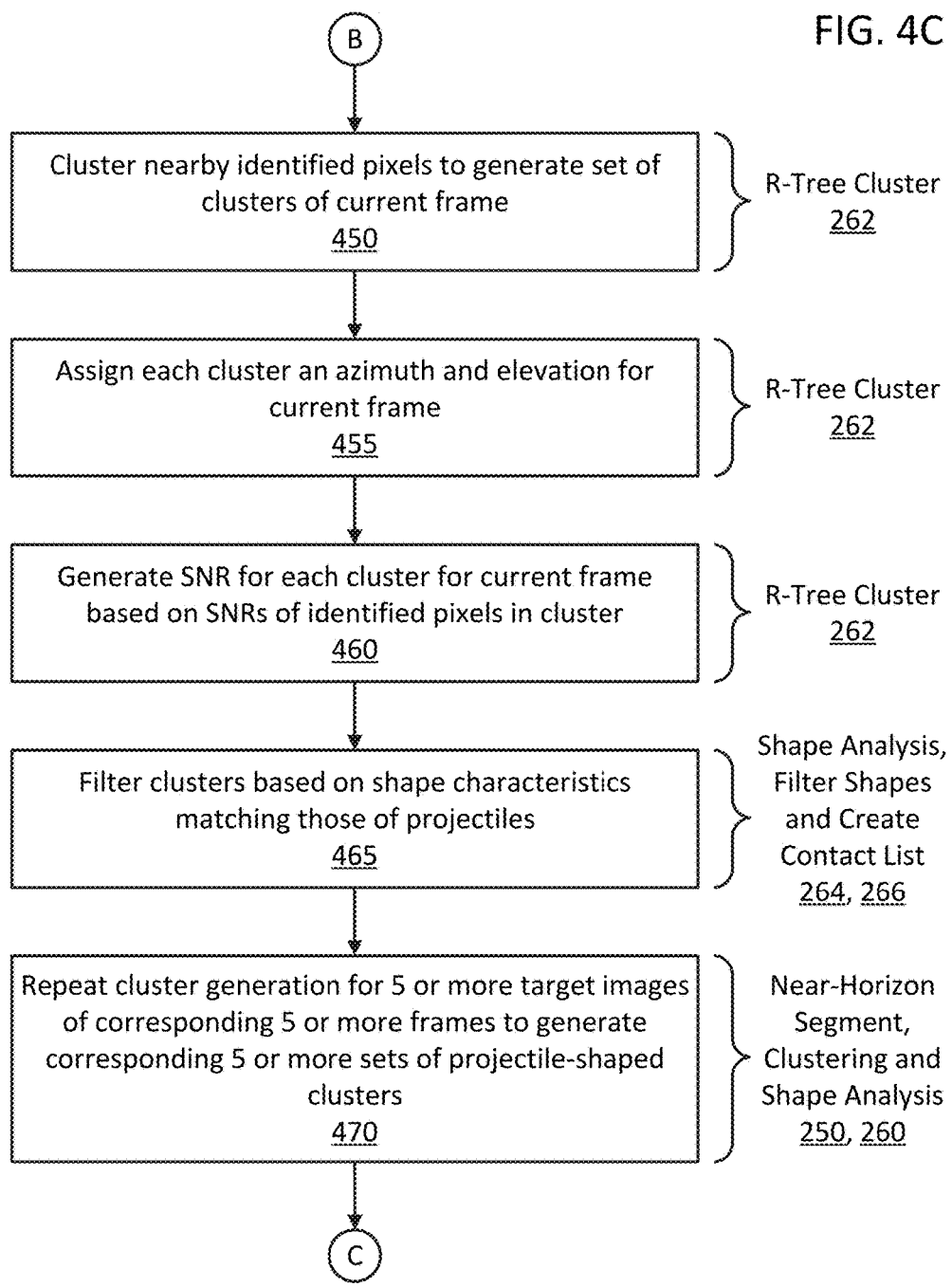

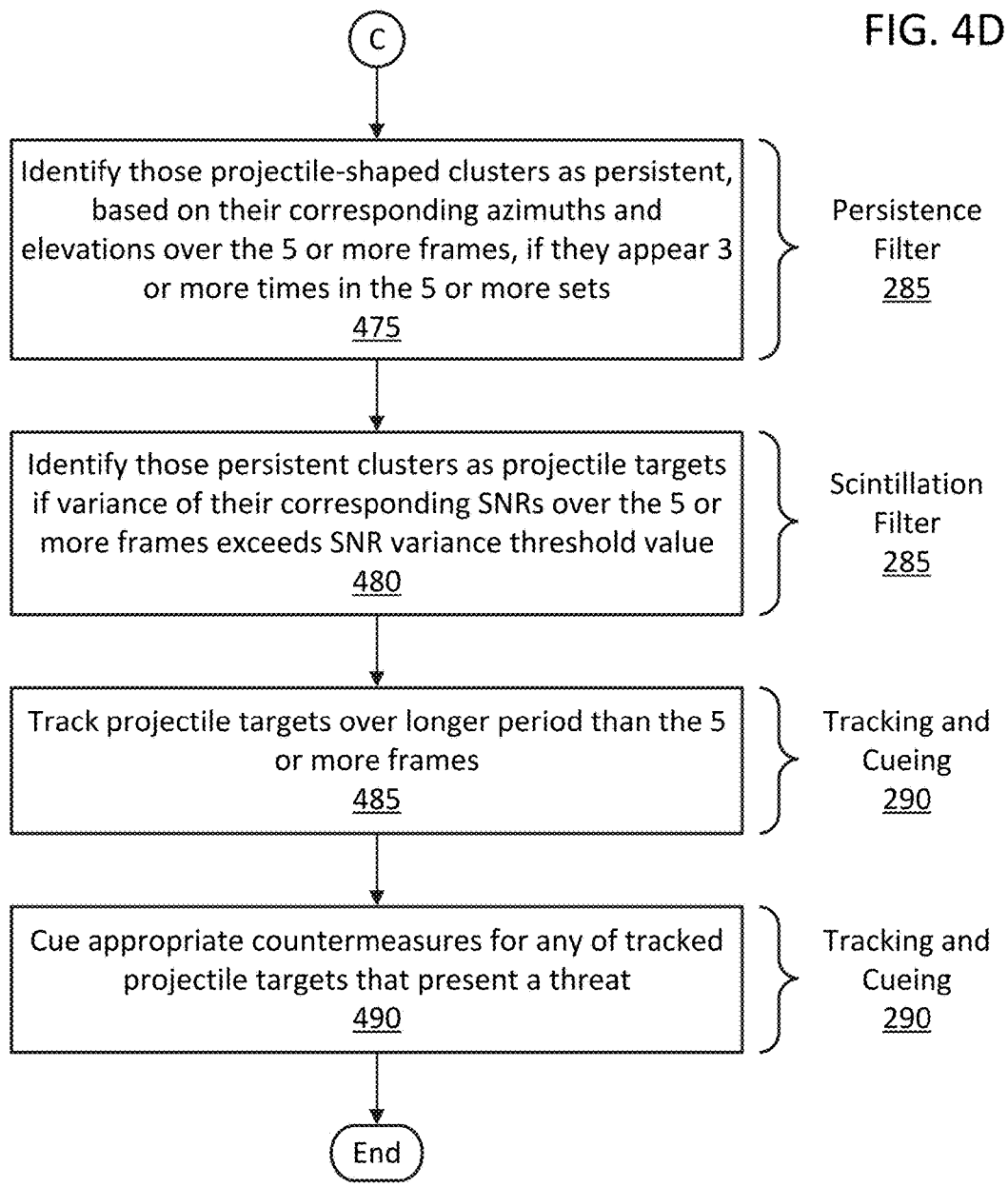

PROJECTILE DETECTION SYSTEM AND METHOD

STATEMENT REGARDING FEDERALLY SPONSORED RESEARCH OR DEVELOPMENT

This invention was made with government support under contract N00173-16C-6008 awarded by the U.S. Navy. The government has certain rights in the invention.

FIELD OF THE DISCLOSURE

This disclosure relates to a system and method of projectile detection, such as for detecting missiles and other threatening projectiles on a naval ship.

BACKGROUND

Platforms such as naval ships face many asymmetric threats, including anti-ship missiles (ASMs) and other projectiles. Detecting such threats is an important first step toward defending against them. However, there are a number of non-trivial issues associated with detecting these threats.

BRIEF DESCRIPTION OF THE DRAWINGS

FIGS. 4A-4D are flow diagrams of an example method of projectile detection, such as for use with the projectile detection system of FIG. 3, according to an embodiment of the present disclosure.

Figure 1:
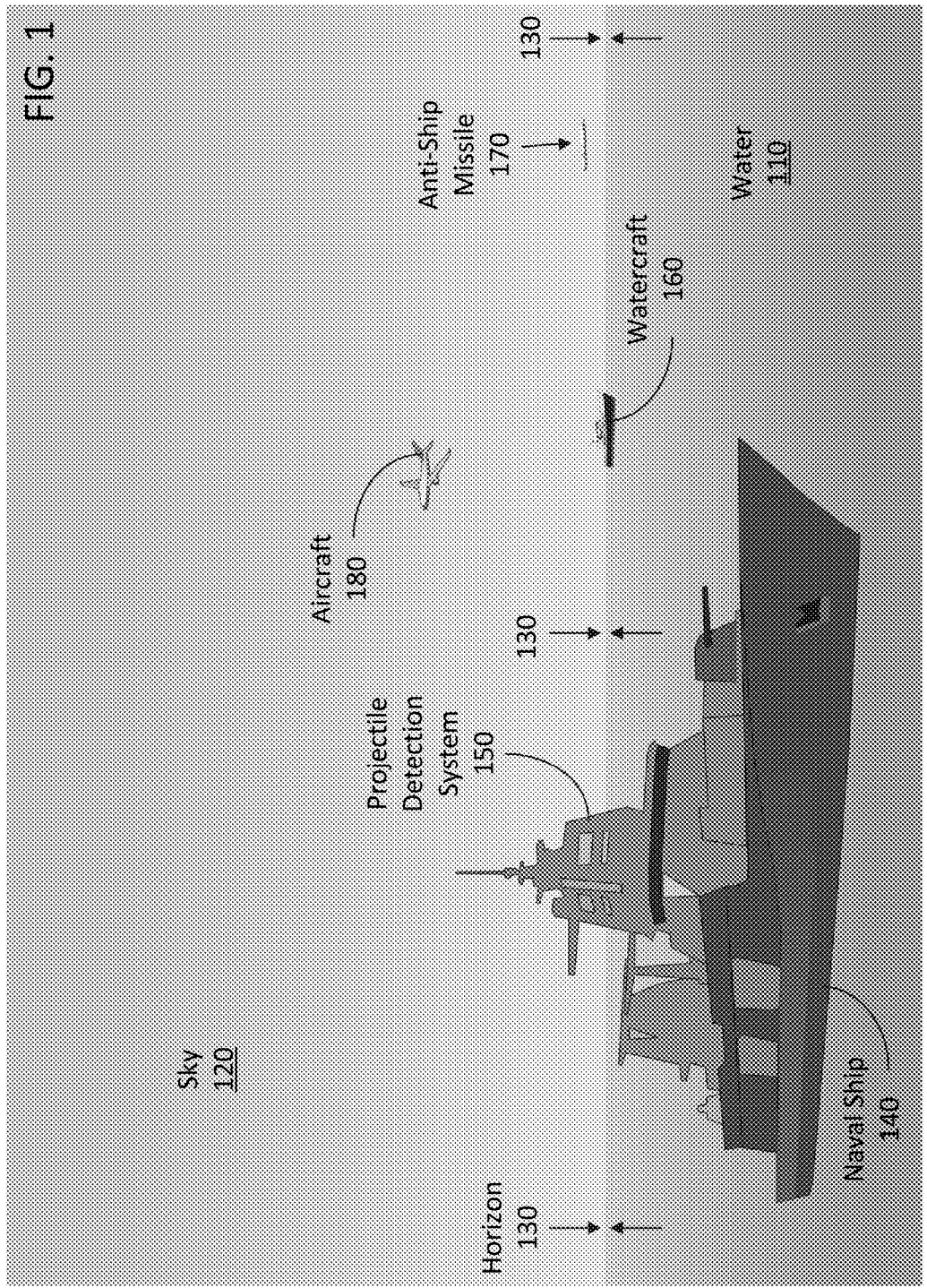
FIG. 1 is a schematic diagram of an example environment for deploying a projectile detection system, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

A projectile detection system for use on platforms such as naval ships is provided. In an embodiment, the system includes an anti-ship missile (ASM) detection circuit and panoramic camera coverage of multiple wavelength regions. The ASM circuit detects anomalous pixels in an image captured by the panoramic cameras, clusters them into discrete contacts, filters them based on spectral and shape characteristics, and saves a contact list with metadata for tracking the contacts. In an embodiment, the system improves the self-defense capability of a ship against asymmetric threats including anti-ship missiles (ASMs) and other projectiles. To accomplish this, the system analyzes video data from multiple spectrums (such as visible and mid-wave infrared (MWIR)), automatically detects threats such as ASMs in a highly cluttered maritime environment, and displays the panoramic video and threat information to the user in an intuitive fashion. In such embodiments, the system analyzes large format video in both visible and MWIR wavelength and automatically detects and tracks threats, cueing appropriate threats to further sensors or countermeasures to engage the threats. In other embodiments, the system is configured to handoff threat information to one or more systems configured to handle tracking and/or countermeasures. In a more general sense, the system can be configured to initiate countermeasures based on the identified missile (or other projectile) targets, which may include for instance tracking and targeting those missile targets, transmission of jamming signals, issuing of decoy targets and chaff, and/or any other suitable countermeasure.

In an embodiment, a projectile detection system includes an image fusing circuit to fuse image data of a current frame from multiple sources (such as a visible light camera and a thermal imaging camera) representing different corresponding bands to create an image. The bands include at least one visible band and at least one thermal infrared band. The system further includes a horizon detecting circuit to identify the horizon in the image, and an image rotating circuit to rotate the image to align the horizon in the horizontal direction. The system further includes a non-linear horizon correcting circuit to equalize the height of the horizon in the horizontal direction of the rotated image, a row detrending circuit to detrend the rows of the equalized horizon-height image, a phase-only transform circuit to perform a phase-only transform of the row-detrended image, and a point spread function circuit to convolve the phase-only transformed image with matched filters to spread point-source targets. The system further includes a signal-to-noise ratio (SNR) thresholding circuit to generate an SNR for each pixel based on the convolved images, and to identify the pixels whose SNR exceeds an SNR threshold value.

In a further embodiment, the system also includes a clustering circuit to cluster nearby identified pixels to generate a set of clusters of the current frame, and to assign each cluster an SNR based on the SNRs of the identified pixels in the cluster. The system further includes a shape filter circuit to filter the clusters based on shape characteristics that match those of missiles or other projectiles, a frame repeating circuit to repeat the cluster generation for five or more images of a corresponding five or more frames to generate a corresponding five or more sets of clusters, and a persistence filter to identify clusters as persistent if they appear three or more times in the five or more sets of clusters. Each persistent cluster has a corresponding SNR for each of the three or more appearances in the five or more sets of clusters. The system further includes a scintillation filter to identify the persistent clusters as scintillating if the variance of their corresponding SNRs over the five or more frames exceeds an SNR variance threshold value, and a tracking circuit to track the scintillating clusters over a longer period than the five or more frames.

General Overview

As mentioned above, there are a number of non-trivial issues associated with detecting asymmetric threats, such as anti-ship missiles (ASMs) and other projectiles. For example, such threats can approach a target platform (such as a naval ship) at high speed and with little apparent signature. In addition, such threats can co-exist in a highly cluttered maritime environment, including clutter such as natural phenomenon (e.g., weather, sea conditions, birds, wave crests, clouds, and objects on land.) and artificial phenomenon (e.g., other vessels or aircraft, both identified and unidentified). Moreover, such threats can be too close to the target platform for radar to accurately detect.

Accordingly, in an embodiment of the present disclosure, a projectile detection system is provided, such as to improve the platform self-defense capability of strategic assets (e.g., naval ships) against asymmetric threats, including ASMs. The projectile detection system automatically detects threats such as ASMs in a highly cluttered maritime environment. To this end, the projectile detection system automatically detects ASMs flying above and near the horizon by using mid-wave infrared (MWIR) and red/green/blue (RGB) or visible/near-infrared (VNIR) camera systems to locate the horizon line and segment the imagery into different regions to analyze. Here, visible includes, for example, 400-700 nanometer (nm) wavelength light while NIR includes, for example, 750-1400 nm wavelength light (such as 800 nm light). Missiles and other projectiles are detected in the near-horizon segment using a Fourier phase-only transform and convolution matched filter to enhance exceedances, then applying multi-frame processing to measure persistence and scintillation (e.g., flicker from missile exhaust) to help filter out background clutter objects.

The combination of MWIR (e.g., 3-8 micrometer (μm) wavelength, or thermal infrared) and RGB or VNIR cameras helps detect ASMs that are too close for radar to accurately detect. In addition, the use of the phase-only transform, matched filter, and multi-frame processing helps to detect single-point (e.g., single pixel or point source) anomalies and distinguish ASMs from background clutter. In some embodiments, combination visible (e.g., RGB)/near-infrared (VNIR) cameras are used instead with the MWIR cameras to provide the complementary wavelength-range video coverage. In some embodiments, long-wavelength infrared (LWIR) radiation (e.g., 8-15 μm wavelength, another band of thermal infrared) is used instead of or in addition to MWIR. Further embodiments of the projectile detection technique extend the detection to other asymmetric threats such as fast-attack craft (FAC) and unmanned airborne vehicles (UAVs or drones). Still further embodiments extend the detection to small, anomalous threats, such as for UAVs at long range or for launch detection of asymmetric threats such as ASMs. Numerous other example embodiments and configurations will be apparent in light of this disclosure.

System Architecture

FIG. 1 is a schematic diagram of an example environment for deploying a projectile detection system 150, according to an embodiment of the present disclosure. The projectile detection system 150 can be deployed, for example, on a naval ship 140 at sea. The naval ship 140 is surrounded by water 110, with sky 120 overhead. The water 110 and sky 120 appear to meet at a distant line called the horizon 130 (or horizon line). The sky 120 can include possible threats, such as aircraft 180, and the water 110 can include possible threats, such as watercraft 160 (near the horizon 130). In some embodiments, the projectile detection system 150 includes a number of cameras arranged to provide 360° detection coverage (such as five to seven cameras (or sets of cameras) each providing 55°-75° of azimuthal coverage per camera or set of cameras).

The horizon 130 is an important region since its distance is fixed (relative to the height of the observer above the water surface), and many asymmetric threats to the naval ship 140, such as anti-ship missile 170 (ASM) first make their appearance at or near the horizon 130. Such threats can travel at great speeds, such as one to several thousand kilometers per hour, and can reach a ship target in only a few dozen seconds from first detection. Automated self-defense systems, such as the projectile detection system 150, can provide the needed detection and response times, such as cueing appropriate countermeasures (e.g., automated guns or missiles and/or jamming) to ward off such threats.

For ease of description, the projectile detection techniques discussed herein are primarily directed to ASMs. However, this is an example threatening projectile to which the techniques can be applied. In other embodiments, the techniques are directed to other threatening projectiles including those having detectable thermal infrared signatures, such as self-propelled projectiles, rockets (e.g., precision-guided rockets and other guided munitions), rocket propelled grenades (RPGs), electromagnetic railguns, and drones with payloads, to name a few.

Figure 2:
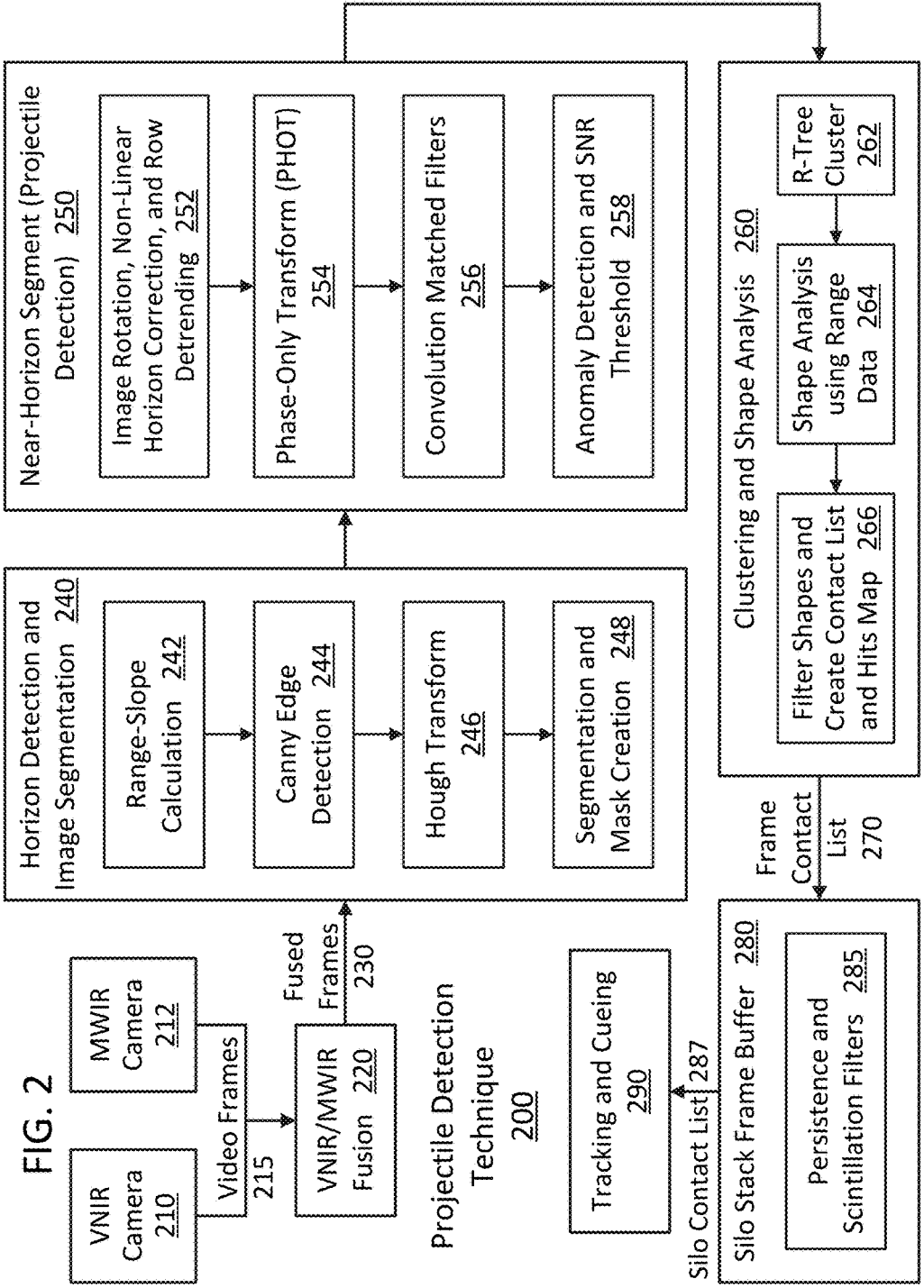
FIG. 2 is a flow diagram of an example projectile detection technique, according to an embodiment of the present disclosure.

FIG. 2 is a flow diagram of an example projectile detection technique 200, such as for use on board a naval ship, according to an embodiment of the present disclosure. In the technique 200, there are two cameras (or types of cameras), namely a visible and near-infrared spectrum (VNIR) camera 210 and a mid-wavelength infrared (MWIR) camera 212. For ease of description, the perspective (e.g., azimuthal coverage, such as 55° to 75°) of only one of each type of camera will be discussed primarily. In some embodiments, multiple (sets of) cameras are employed to increase azimuthal coverage up to, for example, 360°.

In some embodiments, the VNIR camera 210 and the MWIR camera 212 capture overlapping images, such as video frames 215 (e.g., at 24 hertz (Hz)). As used herein, "frame" can refer to the set of data from a sensor (such as an imaging sensor) corresponding to a single image, or to the collection of multiple images acquired at the same time from corresponding multiple cameras, or to the processing that takes place on such images (for the time slice of one frame or one image per sensor). Each frame 215 from these cameras is loaded into a pre-processor, namely VNIR/MWIR fusion 220, to rotate, scale, and align the MWIR image with the VNIR image in the pixel space. After alignment and fusion 220 to make a VNIR-M image (or fused frames) 230, the technique 200 shifts to analyzing, starting with horizon detection and image segmentation 240. In an embodiment, the horizon line is detected through imagery (e.g., the VNIR-M image), and if the imagery is temporarily unreliable (e.g., too obscured), the horizon line can be measured from the ship's inertial measurement unit (IMU).

After determining the horizon line, the portion of the VNIR-M image 230 just above or below the horizon (e.g., the near-horizon segment) is analyzed by projectile (and other anomaly) detection 250. In an embodiment, band ratio and region of interest (ROI) filters are used by projectile detection 250 to remove areas of boat wakes, foam, glint, bad pixels, non-overlapping bands (e.g., color spectrum bands, such as red, green, blue, NIR, and MWIR), and other features indicative of clutter. The filtered anomaly map for the frame is then passed to clustering and shape analysis 260, which clusters and filters the anomaly map by shape and persistence to make a contact list 270 of possible threats for that frame. The contact list 270 is passed to a silo stack frame buffer 280 for analysis over time, and contacts identified as threats are passed to tracking and cueing 290 for further tracking, sensing, and possible engaging by other systems (such as other self-defense systems).

In further detail, in an embodiment, the VNIR/MWIR fusion 220 process of creating fused multispectral images 230 is performed before the horizon detection 240 and anomaly (such as projectile) detection 250. In one or more embodiments, the VNIR image (e.g., four color bands) is used as the base image, and the corresponding MWIR image (e.g., one color band) is scaled, rotated, and shifted to fuse the MWIR data with the corresponding pixels in the VNIR data, such as the same pixel space with five color bands per pixel. In some embodiments, the MWIR camera and VNIR camera are mounted together in a common frame such that they experience similar motions and capture images in synchronization with each other. As such, the camera pair can be calibrated to determine how one camera's image (e.g., the MWIR) deviates from the other's (e.g., the VNIR), for example, so the two images can be registered as part of the fusion process.

In an embodiment, bicubic interpolation is used for the rotation processing to reduce or prevent the imagery from aliasing on the horizon line, which can otherwise cause undesired effects such as artifacts when performing the anomaly detection 250. The fused image 230 can then be used for horizon detection and image segmentation 240 as well as anomaly detection 250. In an embodiment, another image array is generated for band ratio analysis by dividing each band by its mean and normalizing the variations in intensity. In some embodiments, the video data includes five bands (such as two-byte intensities for each band), such as red, green, blue, NIR, and MWIR. In some other embodiments, the video data includes four bands, such as red, green, blue, and MWIR.

In an embodiment, horizon detection and image segmentation 240 begins with range-slope calculation 242. The relationship between distance below the horizon and range is calculated using the field of view for the sensor (such as the VNIR camera 210 or the MWIR camera 212) and its height above the water. From these, the relative change in size of an object in pixels per meter can be calculated. For example, the distance to a boat below the horizon can be determined by knowing the number of pixels between the boat's waterline and the horizon.

An important component of horizon detection and image segmentation 240 is finding the horizon line. For example, without an accurate horizon line, it is not possible to determine range (e.g., to a watercraft located below the horizon) or detect ASMs at their earliest appearance. In an embodiment, the horizon is detected in imagery, if visible, using Canny edge detection 244 and Hough transform 246. If the imagery does not have a horizon or it is not detected, the approximate location of the horizon can be estimated by using the IMU. In an embodiment, imagery from the MWIR camera 212 or the VNIR camera 210 is used for horizon detection, depending on factors such as the environmental conditions. For example, the view of the horizon may be obscured in one of the cameras but not in the other.

In an embodiment, there are multiple components of the Canny edge detection 244. These include region of interest (ROI) cutting, Gaussian smoothing, image differentiation, and non-maximal suppression (or edge thinning). With ROI cutting, the section of the image within the ROI settings (e.g., the interior region of a camera's image, which has less distortion than the perimeter region) is cut out along with an extra offset for possible extra columns and rows of interest, and with one spectral band (and corresponding intensity map, such as red). The image subset provides sufficient contrast to identify the horizon. During Gaussian smoothing, this image subset is smoothed using a Gaussian blur filter to blur the image subset. The blurred image can make the horizon easier to detect while making other image effects less noticeable. In an embodiment, the Gaussian blurring uses a convolution filter where the edges are replicated, using a sigma value of 4 and a blur kernel size of 15×15 pixels.

In image differentiation according to an embodiment, the blurred image is run through an iterative loop of the Canny edge detector, varying the threshold parameter (or parameters) until a line is returned. In an embodiment, the image differentiation of the Canny edge detector employs a Sobel kernel that does no smoothing. This is one reason for performing the Gaussian smoothing earlier. In an embodiment, the Sobel kernel is a 7×7 matrix. The gradients are calculated by applying the Sobel filter in the horizontal and vertical directions to produce corresponding approximations of the first derivatives of the image intensities in the horizontal and vertical directions. The horizontal and vertical outputs $I_x$ and $I_y$ of the derivative operation for each pixel are used to find the image gradient (magnitude and direction) and highlight regions with high spatial derivatives. The direction θ of the gradient is calculated as $θ=\tan^{-1}(I_y/I_x)$ with angles compared to four directions (0°, 45°, 90°, and 135°, representing horizontal, vertical, and the two diagonal directions) to determine the closest gradient direction.

In non-maximal suppression according to an embodiment, there is an image (e.g., a gradient image or gradient map) with a measure of the magnitude of intensity change (M). The non-maximal suppression includes suppressing areas in the gradient image where the rate of change is low. In an embodiment, the suppression tracks along the region above zero in the gradient map and suppresses any pixel that is not at the maximum (hence the term non-maximum suppression), such as a local maximum. This is done by checking if each non-zero gradient magnitude $M_T$, corresponding to a point (x,y) in the gradient map M, is greater than that of its two nearest neighbors along the corresponding gradient direction θ. If not, the magnitude at that point M(x,y) is set to zero (e.g., suppressed).

In an embodiment, there is also a "hysteresis" process of suppressing maxima that uses two thresholds, $T_{high}$ and $T_{low}$ (e.g., Canny edge detection parameters that can be lowered if too many points are removed by the hysteresis process). If the magnitude at a point in the gradient map is less than or equal to the low threshold $T_{low}$, that point's magnitude is instead set to zero (not an edge). If the magnitude is above the high threshold $T_{high}$, that point is classified as a strong edge pixel. If the magnitude is between the two thresholds $T_{low}$ and $T_{high}$, it is classified as a weak edge pixel. A weak edge pixel can be set to zero if it is not adjacent to (e.g., among its eight neighbors) a strong edge, or its value maintained (e.g., remain a weak edge) if there is a path from this pixel to a pixel (e.g., an adjacent pixel) with a gradient above the high threshold $T_{high}$ (e.g., a strong edge pixel). In an embodiment, the threshold values $T_{high}$ and $T_{low}$ are scaled down (e.g., to 80% of their original values, and then to 60% of their original values) and the hysteresis repeated if insufficient edge points remain to generate a solid edge that can represent the horizon.

In an embodiment, after the edge points are identified, line segments linking the edge points are constructed using linear interpolation, adjusting based on the closest direction (e.g., 0°, 45°, 90°, and 135°). If no lines remain, multiple further iterations can be performed with smaller threshold values. In an embodiment, if no lines can be detected even after multiple iterations, the horizon is defaulted to the IMU horizon.

In some embodiments, the output of Canny edge detection 244 is a binary map, often a mass of connected and unconnected lines depending on factors such as the number of waves and amount of contrast of the scene. In some such embodiments, the straightest, longest, and highest line in the image is located using a Hough transform 246, a discrete version of the Radon transform that allows for groupings of edge points from the Canny edge detection 244 into obstacle candidates by performing an explicit voting procedure over a set of parameterized image objects. In some such embodiments, collinear points are mapped onto intersecting sinusoids, such that the polar coordinates (d,θ) of the intersection point (of the sinusoids) identify the line containing the aligned points, the line having slope 180°-θ and going through the intersection point. In some embodiments, the Hough transform 246 is applied to the many points or line segments from the Canny edge detection 244, such as points or line segments touching or within a set distance of each other.

In an embodiment, the angle θ varies between 0° and 180° in 0.5° (8.7 milliradians) increments, and a line through each point in the Canny edge detection 244 is constructed normal to a vector at angle θ. In some other embodiments, smaller angle increments are used, which improves accuracy but increases processing time. In addition, the perpendicular distance d with respect to the origin is computed. In further detail, for the point at position $(x_0,y_0)$ in the Canny edge detection 244, the Hough transform 246 maps the point $(x_0,y_0)$ into a sinusoid in (d,θ) space. The parameter d is given by $d=x_0 \cos \theta + y_0 \sin \theta$. The line containing $(x_0,y_0)$ is then given by $y=y_0+(x_0-x)\cot \theta = d \csc \theta - x \cot \theta$. Each pair of points in the Canny edge detection 244 generates a swath for each angle θ as defined by the two corresponding parallel lines of the Hough transform 246. The swath width w is the distance between these parallel lines (e.g., the difference between the corresponding d values), and the swath size n is the number of points in the Canny edge detection 244 contained in the swath.

In some embodiments, a maximum swath width is defined, and the angle θ varied until a horizon line is found. The horizon line is a set of points forming a line in the Canny edge detection 244 that all fall in the same swath and whose width w is no larger than the maximum swath width. In one such embodiment, there are thresholds for the minimum number of points within a line segment (for example, 100), the maximum number consecutive gap fill pixels (for example, 40) not in the Canny edge detection 244 but that connect two line segments to form a longer line of the same slope, and the minimum line length (for example, 200 points) assuming such gaps are filled. For each angle θ, lines are formed (all of whose points lie in the same swath and satisfy the above thresholds), and the longest such line for each θ saved. After analyzing for each angle θ, the longest line of any of the θ is chosen. If this chosen line also falls within, for example, 25 pixels of the IMU horizon and its slope is within, for example, 50 milliradians (or 3°) of the IMU horizon, the line is retained for use as the horizon line, and its start and end points used to define the horizon line. If no such horizon line is detected in the imagery, the IMU horizon is used.

In one or more embodiments, after the Hough transform 246, processing continues with segmentation and mask creation 248, during which the image is segmented into regions of interest (ROIs) based on one or more masks created to perform the segmentation. In one such embodiment, once the horizon line is detected, either from imagery or the IMU, the points identified as the horizon are used to create the main image mask (or filter mask). This filter mask is used in anomaly detection, such as to mask out the sky from background calculations. In an embodiment, the filter mask is an array of ones, the size of the image, and has zeros outside the region of interest (ROI) borders for a particular sensor (e.g., above the horizon). Particular sensors may have additional areas (besides above the horizon, such as edge pixels or pixels near the edge, where sensor resolution is not as precise) not in their ROI and that are also set to 0.

Phenomena such as persistent foam from glint reflections, breaking waves, and boat wakes can be a source of false detections when analyzing shipboard imagery. To help reduce clutter such as this (especially that are caused by the wake behind the ship carrying the projectile detection system), in an embodiment, a glint mask is created from a band ratio image. The band ratio takes advantage of the relative coolness (e.g., low intensity values) of foam and glint in the MWIR image and brightness (e.g., high intensity values) in the red band of the VNIR image. A glint ratio (e.g., MWIR value divided by red value) for each pixel is generated. In an embodiment, a minimum red value allowed is used in combination with a minimum band ratio allowed (such as 0.85). Pixels having too low a red value (e.g., poor daylight) are not considered while pixels having a ratio less than the minimum band ratio are considered glint, and the glint mask changed accordingly (e.g., zeroed out at the location corresponding to the pixel). In an embodiment, a maximum band ratio (such as 10) is also defined, pixels exceeding the maximum band ratio being considered artifacts and removed by the glint mask.

A value of 0.85 for the minimum band ratio is relatively low and should work under most conditions. In an embodiment, under clear conditions (and good daylight), a higher minimum band ratio (such as 1.5) is used since few pixels are likely to be excluded with the lower value. However, in some embodiments, to prevent too many pixels from being excluded, if the number of pixels below the minimum band ratio is more than 90% of the pixels, the mean band ratio is substituted for use in the minimum band ratio test (e.g., to exclude no more than about half the pixels). It should be noted that while the ability to use VNIR light degrades rapidly with decreasing daylight, MWIR light is primarily heat energy generated from ambient sources and is generally usable even in low light or no daylight situations.

As part of the segmentation 248, because of the changes in contrast with range and illumination, in some embodiments, the detection process is broken into multiple segments relating to regions relative to the horizon, such as below the horizon, above the horizon, and near the horizon. Near the horizon, the brightness, contrast, and target size change dramatically compared to the part of the image closer to the ship. Another concern arises with the fused image data, since the VNIR image quality degrades with range faster than the MWIR. This creates low contrast between bands, which affects the covariance matrix (e.g., of pixel intensity variations and correlations between the different bands). This can lead to fused images with high-contrast MWIR pixels on a distant target but low-contrast VNIR pixels, causing low signal-to-noise ratio (SNR) on the target.

For this and other reasons, in some embodiments, the MWIR processing and the VNIR processing are split into two paths near the horizon (e.g., the horizon segment), such as a VNIR path using one band from the VNIR data (e.g., red) as well as a MWIR path using the VNIR-M subset (the MWIR horizon segment portion). Using one VNIR band near the horizon helps reduce the effects of poor signal strength between the multiple bands affecting the covariance matrix. In one specific embodiment, before segmentation, the top and bottom of the horizon section are calculated from the upper and lower rows of the horizon line vector, adding in an offset above and below the calculated (e.g., imaged or IMU) horizon, such as 5 pixels above the horizon line and 40 pixels below the horizon line, with an extra pixel above and below the horizon line to account for interpolation error. These offsets are used to create a horizon mask for the horizon section.

In one or more embodiments, after the horizon detection and image segmentation 240, processing enters the near-horizon segment 250, during which targets such as projectiles are automatically detected. Here, the targets can be of unpredictable size, shape, and color. In some embodiments, for the near-horizon segment 250, the MWIR data in the horizon segment (MWIR horizon segment) undergoes pre-processing. In some such embodiments, the pre-processing includes image rotation, non-linear horizon correction, and row detrending 252. Pre-processing is useful to prevent too many artifacts (e.g., false targets) from being generated during later projectile detection stages.

According to one or more embodiments, image rotation rotates the imaged horizon to make the image straight and allow for removal of distortion and intensity variations. The angle of the rotation is based on the pixels detected as bounding the horizon from the horizon detection 240. In one such embodiment, the rotation is done with bicubic interpolation instead of other techniques (such as nearest neighbor), which can introduce artifacts. In an embodiment, the segments to be analyzed are cut out from the rotated arrays to avoid using blended pixels from the interpolation, masking out other areas of the image when appropriate (e.g., not part of the horizon segment).

According to one or more embodiments, non-linear horizon correction includes removing distortion (such as warping) in the imagery around the horizon to enable more accurate (and in some cases, meaningful) row processing, such as consistent elevation for all pixels in the same row (or horizontal direction). In one such embodiment, each column of the horizon segment is run through a derivative calculation to find the maximum peak around the expected location of the horizon. The offset of each column is calculated, then a fourth-degree polynomial is fitted to the points to determine pixel and sub-pixel shifts. The polynomial values are used for an interpolated transform on each column to shift pixels up and down by the fractional offset (or one or more pixels of offset, such as two, three, or even four pixels off in some cases, together with a fractional offset). This generates consistent elevations for the pixels in each row.

According to one or more embodiments, row detrending (such as removing the background trend) includes removing the non-uniformities in the horizon segment caused by factors such as vignetting or variations in illumination. This can enhance detection of bright objects, such as missiles and other threatening projectiles. The row detrending takes advantage of the consistent elevation across each row (as performed in the non-linear horizon correction), so that only trends within the same elevation are used for the detrending. In one such embodiment, the processing for each row of the horizon segment includes creating a vector from the pixels in the columns for that row, and fitting with a third-degree polynomial to find the underlying curve of brightness. The value of the polynomial function at each column is subtracted from the vector to make a normalized horizon segment (e.g., with no background trend). The normalized curve has negative values zeroed to reduce variance of the background, with the assumption that targets such as missiles and other projectiles have MWIR signatures brighter than the background, so will stand out from any of the zeroed pixels.

In some embodiments, the MWIR near-horizon segment 250 processing continues with projectile detection, such as phase-only transform (PHOT) 254, convolution matched filters 256, and anomaly detection and SNR thresholding 258. In some such embodiments, the projectile detection operates on the MWIR horizon segment, primarily focused on detection above the horizon but can be used to detect projectiles below the horizon as well.

According to one or more embodiments, the phase-only transform 254 includes running the MWIR horizon segment or array through a phase-only transform (PHOT) technique to reduce background clutter into a Gaussian distribution, similar to a whitening filter. This keeps only phase information, not intensity, which can enhance the pixels of objects of interest such as missiles and other threatening projectiles. In one such embodiment, a two-dimensional (2D) discrete Fourier transform (such as with a 2D fast Fourier transform, or 2D FFT) is performed on the image section (e.g., image domain) to generate transformed image data F (e.g., frequency domain). The transformed image data F is normalized by dividing each entry of F by its magnitude. The phase-only data I is then extracted by performing the inverse 2D FFT on the normalized F.

According to one or more embodiments, the convolution matched filters 256 includes convolving the phase array I with five matched filters. In one such embodiment, five 5×5 point spread function (PSF) convolution matched filter kernels are used, corresponding to five different sets of weights, such as center, left-center, right-center, bottom-center, and top-center. The different weight sets, for example, enhance detection in particular directions. In some such embodiments, each operation is done in parallel. In some such embodiments, point spread convolution filters are used, to spread out pixels (e.g., convert substantially single-pixel objects like missiles and other projectiles into multiple pixels, such as six pixels). In some embodiments, the output image P of each filter is transformed into signal-to-noise ratios (SNRs) by calculating the mean and standard deviation of the image (mostly background, after operations such as the row detrending), then running an SNR equation on each pixel. In one such embodiment, SNR is defined for pixel $(i,j)$ as $SNR(i,j)=(P(i,j)-Mean)/StDev$ for each of the five different output images P, where Mean is the mean pixel intensity and StDev is the standard deviation of the pixel intensities. Missiles and other projectiles are assumed to be brighter than the background, so generate relatively high SNRs, such as at least 6.

According to one or more embodiments, the anomaly detection and SNR thresholding 258 attempts to find missiles and other targets of interest (together referred to as anomalies) by examining the SNR arrays. The SNR arrays for the five matched filters are combined into a three-dimensional (3D) array, and the maximum value at each pixel is determined to produce MaxSNR. The new array MaxSNR is filtered by a threshold SNR value (such as 6) to filter out background clutter. In some embodiments, projectile detection results are saved back into an image array ImageOut with dimensions matching the original image. In some such embodiments, the output filter map ImageOut is produced so results from other detections (such as boats, FACs, UAVs, and the like) can be incorporated. In some embodiments, the threshold SNR value differentiates pixels of interest (such as missiles or other projectiles) from background pixels and normal or noise variances. In an embodiment, those pixels exhibiting a high SNR, such as greater than the SNR threshold are assumed to be a missile (or another feature of interest or anomaly).

Referring to FIG. 2, after the near-horizon segment (projectile detection) 250 portion, processing continues with clustering and shape analysis 260. In some embodiments, the output filter map ImageOut is clustered using R-tree clustering 262. In some such embodiments, clustering 262 begins with a binary map BM (e.g., from the nonzero entries in ImageOut) and a group radius parameter value (such as 3) and identifies clusters of pixels. In one such embodiment, a cluster includes multiple pixels within the group radius of each other (e.g., identifies clusters of pixels), or within the group radius of an existing cluster, as members of a cluster object $C_n$. Here, C is the set of all cluster objects $C_n$ identified in BM. In one such embodiment, the output of the R-tree clustering 262 is defined for each cluster $C_n$ as a set of pixel indices of all pixels (e.g., nonzero pixels in BM) within the cluster G. Once cluster objects have been identified, statistics can be computed for these objects, such as size statistics, centers (e.g., centroids), azimuth and elevation, and SNRs (e.g., from the corresponding pixel SNRs, such as average SNR, maximum SNR, total SNR, and the like). In some embodiments, some of these statistics are used to perform shape analyses on the cluster objects $C_n$, part of shape analysis using range data 264.

In an embodiment, these shape analysis parameters are determined by fitting a data ellipse to the pixel distribution within the cluster $C_n$. The size and shape parameters are derived from the major and minor axes of the ellipse. In an embodiment, the detection pixels of an underlying hard target are assumed to be distributed according to a rectangular distribution function. The variance $\sigma^2$ and length L of a rectangular distribution are related by $$\sigma^2 = \frac{1}{12}L^2.$$

The length and width of the hypothesized target object producing the detected cluster $C_n$ can be determined from the variance of the distribution of pixels within the cluster. In an embodiment, a 2×2 spatial covariance matrix associated with the cluster $C_n$ is $$\sum(C_n) = \begin{pmatrix} \sigma^2_{row(j)} & \sigma^2_{ij} \\ \sigma^2_{ij} & \sigma^2_{column(i)} \end{pmatrix},$$

where $\sigma_{row(j)}^2$ and $\sigma_{column(i)}^2$ are the variances of the row and column indices, respectively, in the and cluster $C_n$ and $\sigma_{ij}^-$ is the row-column covariance.

Defining $\lambda_1$ and $\lambda_2$ as the eigenvalues of $\Sigma(C_n)$, with $\lambda_1 \geq \lambda_2$, the major and minor axis statistics of the cluster $C_n$ are defined as major axis=$\sqrt{12\lambda_1}$ and minor axis=$\sqrt{12\lambda_2}$. These lengths are in pixels. In some cases, such as for watercraft having an identified waterline, they can be converted into another unit of measurement (such as meters) by multiplying by the corresponding separation between pixels at the corresponding distance (e.g., from range-slope calculations), such as meters per pixel. In an embodiment, the orientation $\varphi$ of the major axis for the data ellipse to the pixel distribution in the cluster $C_n$ is computed using the relationship $$\sin(\varphi) = \frac{\sigma^2_{ij}}{\sqrt{\sigma^2_{ij} + (\lambda_1 - \sigma^2_{column(i)})}}.$$

In some embodiments, the axis ratio (major axis divided by minor axis) is computed. In some embodiments, projectile targets are assumed to have axis ratios between 1 and 1.5. In some embodiments, the detection centroid (center pixel in the cluster) is computed or otherwise determined, and for the cluster $C_n$ is denoted by $\langle C_n \rangle_i$ for the centroid column and by $\langle C_n \rangle_j$ for the centroid row.

The output filter (or anomaly detection) map ImageOut has groups of pixels (or clusters, including single-pixel clusters). However, not every cluster is an object of interest or an intended target. Accordingly, in some embodiments, the output ImageOut of the cluster algorithm is filtered to remove clutter such as from waves, foam and, other common natural phenomena. In some embodiments, clusters from ImageOut are filtered by area, axis ratio, and porosity. Porosity is a number indicating how empty or disconnected (e.g., how many holes) a cluster is, with higher numbers indicating more holes than filled pixels.

In some embodiments, the area is the number of pixels in the cluster. In some such embodiments, the area and axis ratio are scaled by the distance from the horizon, using, for example, the range-slope techniques discussed above. For example, in some embodiments, the origin is at the top left corner of the image, such that the bottom of the cluster is the highest row value of the cluster. In some embodiments, the porosity is defined as the product of the major and minor axes divided by the area. In some embodiments, the horizon distance is defined as $$\frac{(y_0 - y_1)x + (x_1 - x_0)y + (x_0 y_1 - x_1 y_0)}{\sqrt{(x_1 - x_0)^2 + (y_1 - y_0)^2}},$$

where $P_0=(x_0,y_0)$ and $P_1=(x_1,y_1)$ are the first and second points on the horizon, and $X=(x,y)$ is the target location. In some embodiments, there is additional logic to filter clusters based on the number of pixels above or below the horizon.

In some embodiments, the shape analysis 264 includes projectile thresholds for area and axis ratio that depend on the sensor but range from 6-20 pixels for area with a maximum axis ratio of 1.5 and a porosity maximum of 6. For instance, clusters are only kept as possible projectiles if they have between 6 and 20 pixels (inclusive), their maximum axis ratio is no greater than 1.5, and their porosity is less than 6.

After shape analysis 264, processing continues with filtering shapes and creating a contact list and hits map 266. In some embodiments, clusters that pass the shape analysis 264 are run through a second, more precise cluster operation (also called re-clustering), such as to remove sections that are not touching. In some such embodiments, cluster statistics further include a roundness statistic, such as $4\pi \times Area / Perimeter^2$, where Area is the number of pixels in the cluster and Perimeter is the smallest number of pixels that surrounds and encloses (e.g., completely encloses) the cluster. In some embodiments, clusters that survive re-clustering are saved in the frame's (e.g., image frame's) contact list 270 (or hits map) for further processing. In some such embodiments, azimuth and elevation are determined for each such cluster (e.g., based on a center or centroid of the cluster), as well as SNR (such as average SNR for each pixel, maximum SNR over all pixels, or total SNR of all pixels), and stored with the cluster entry in the frame's contact list.

In one or more embodiments, processing for the contact list 270 (e.g., clusters representing possible targets of interest) for the frame passes to the silo stack frame buffer 280. In some such embodiments, the silo stack frame buffer 280 inserts the contact list 270 into a first in, first out (FIFO) queue of recent contact lists (e.g., for the five or six most recent frames). In some such embodiments, for projectile detection, the silo stack frame buffer 280 processing includes persistence and scintillation filters 285. In an embodiment, the persistence filter 285 calculates detections per opportunity, such as to see if a cluster is in the silo stack frame buffer 280 for a sufficient minimum number of frames in (such as three or four) that, for example, it is not the result of some spurious signal (e.g., that is only present for a frame or two).

In some embodiments, cluster detections from multiple frame contact lists are grouped together based on their azimuth and elevation (e.g., the same or very close values) and used to calculate persistence (detections per opportunity) and scintillation (SNR variance). Contacts that pass thresholds for persistence (such as at least half (or other threshold fraction) of the frames in the silo stack frame buffer 280) and scintillation (such as high variance, e.g., in the top half of the persistent clusters, or SNR variance above a threshold value) are passed on to a silo contact list 287. In some embodiments, the silo contact list 287 represents those clusters that possess all of the criteria (as discussed above) to identify them as possible projectiles and are passed to tracking and cueing 290 processing. In some embodiments, the tracking and cueing 290 create tracks (such as with a Kalman filter) to monitor the possible projectiles over time, and cue or otherwise initiate appropriate responses or countermeasures (e.g., alert anti-missile defense platforms such as intercept missiles and guns to prepare) to engage the incoming threats.

Figure 3:
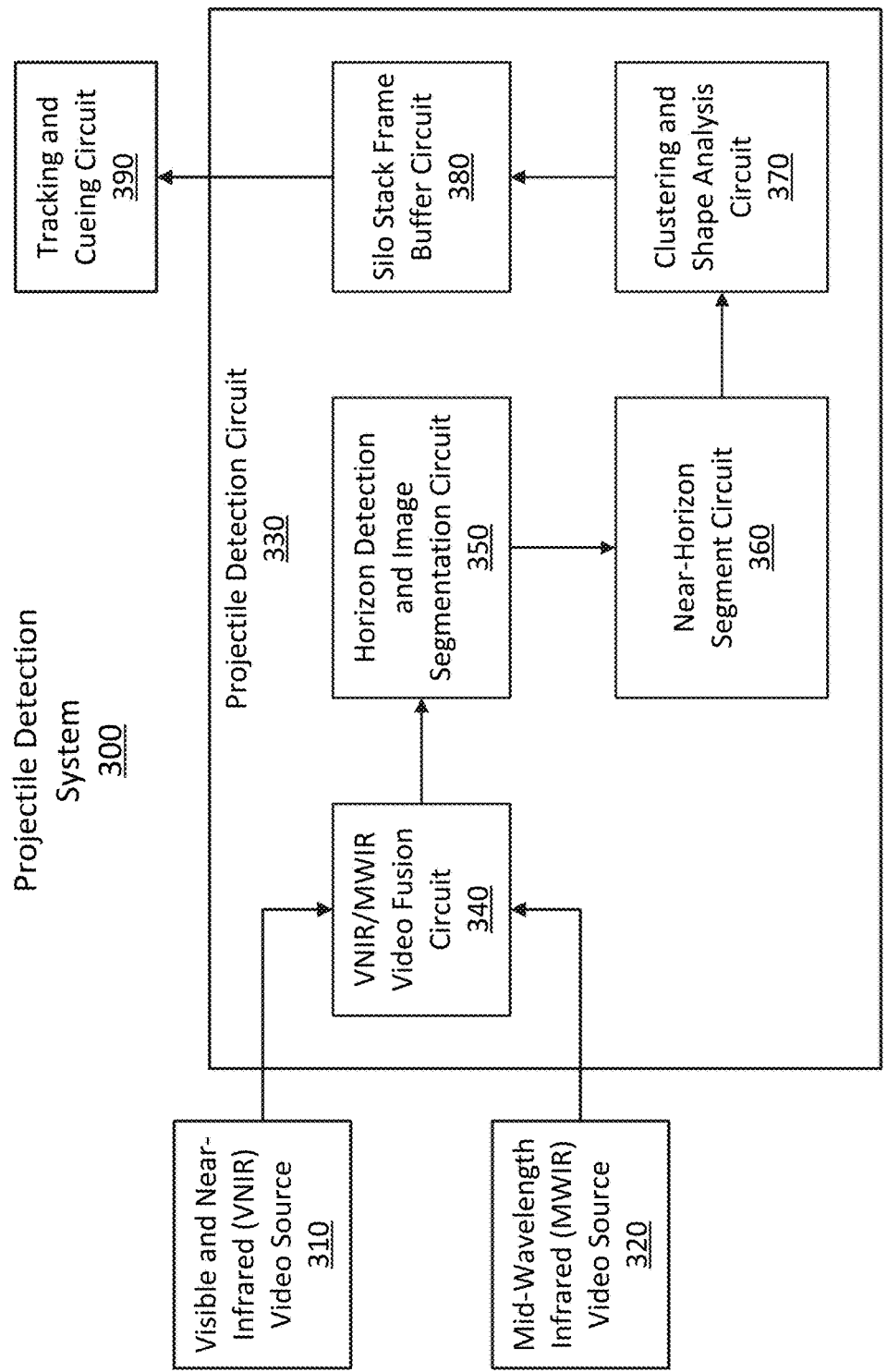
FIG. 3 is a block diagram of an example projectile detection system, such as for implementing the projectile detection technique of FIG. 2, according to an embodiment of the present disclosure.
Figure 4A:
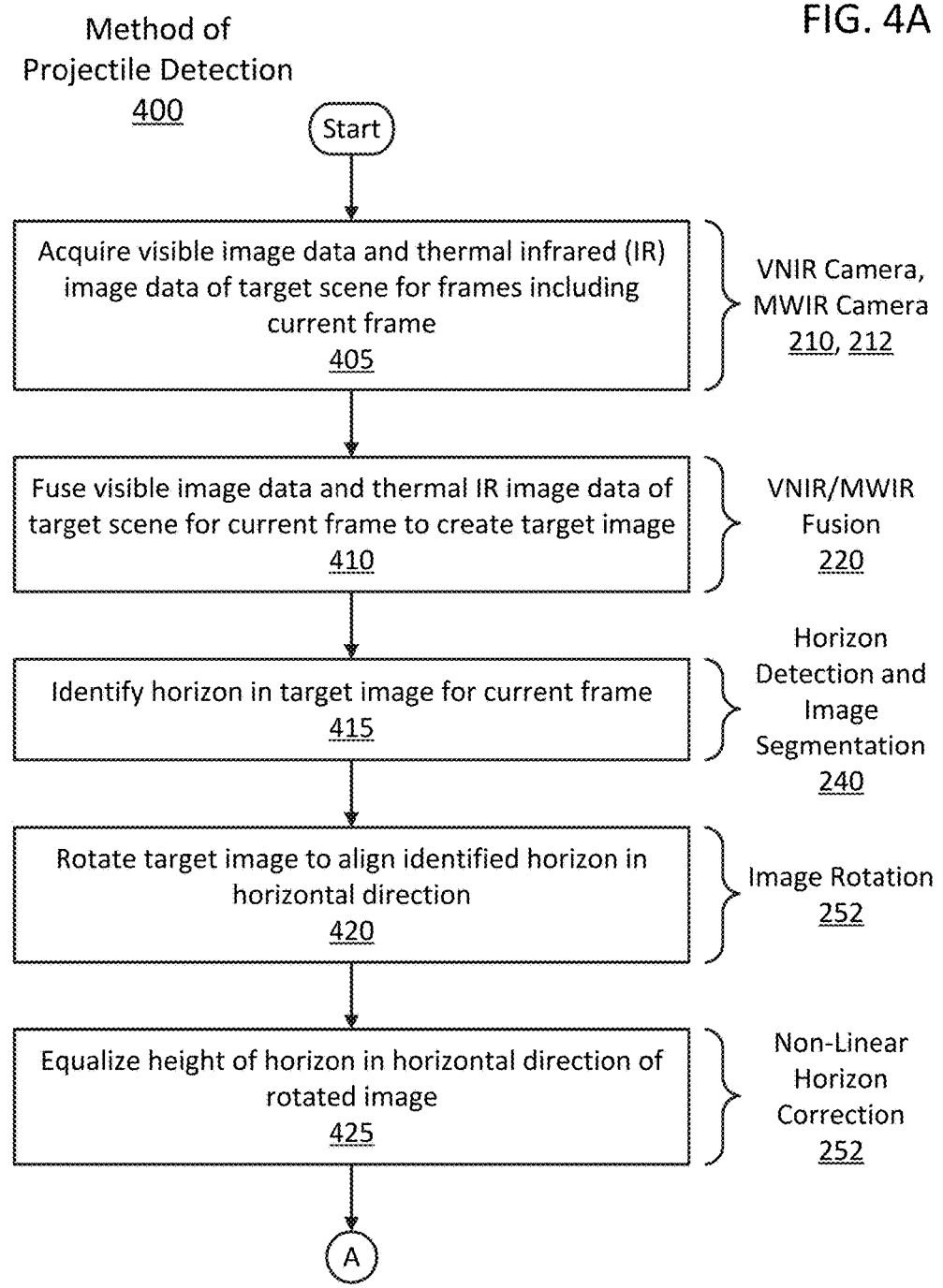
Figure 4B:
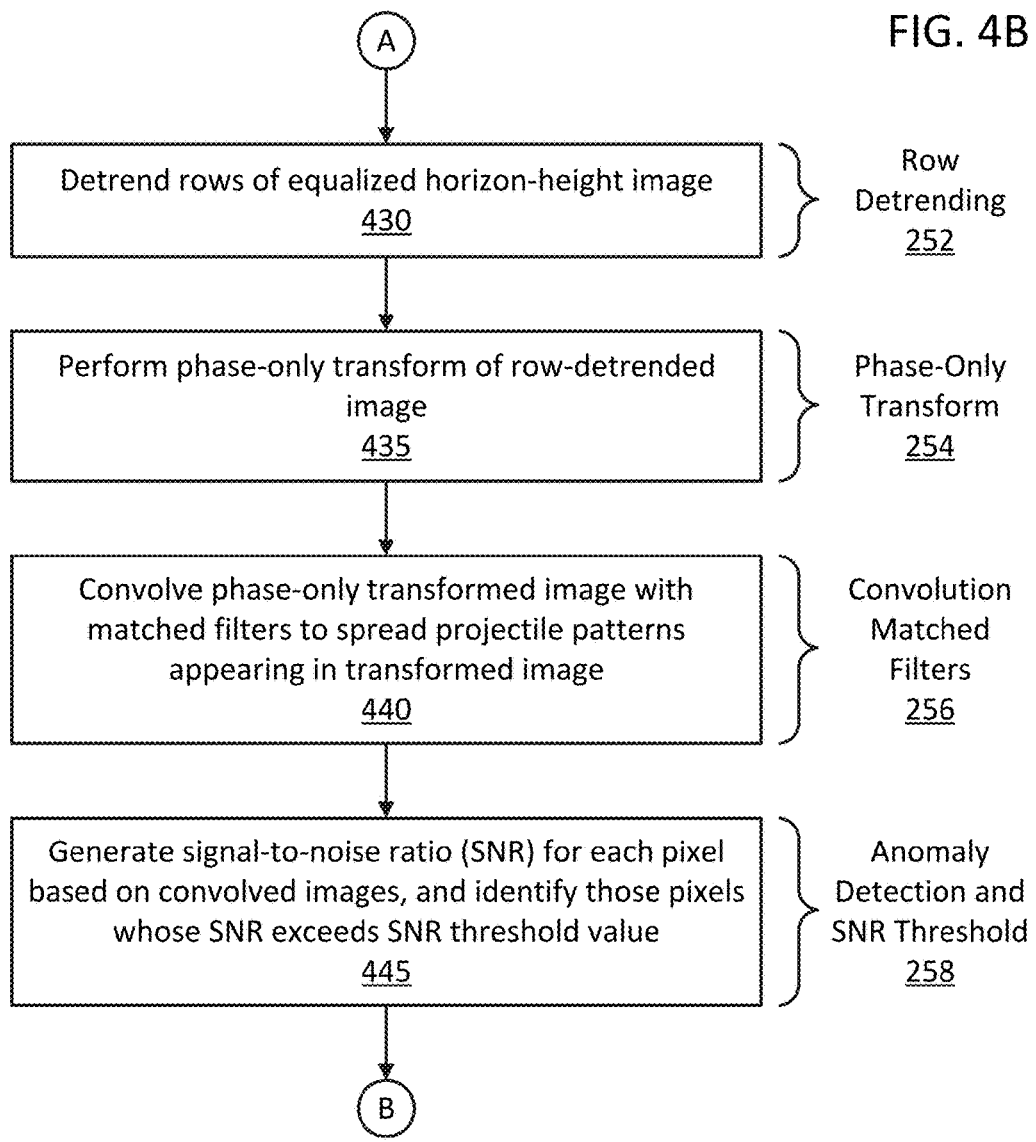

FIG. 3 is a block diagram of an example projectile detection system 300, such as for implementing the projectile detection technique 200 of FIG. 2, according to an embodiment of the present disclosure. The projectile detection system 300 includes a visible and near-infrared (VNIR) video source 310, a mid-wavelength infrared (MWIR) video source 320, a projectile (or other anomaly) detection circuit 330, and a tracking and cueing circuit 390 for further sensing, tracking, and possible engagement by other shipboard systems.

The projectile detection circuit 330 and other electronic components, circuits, and techniques described herein can be implemented as (or on) an electronic processing component, such as a signal processor, a field programmable gate array (FPGA), a microprocessor, or the like. For example, the projectile detection circuit 330 and other components or methods can be implemented in hardware or software, or some combination of the two. For instance, the projectile detection circuit 330 can be implemented as a microprocessor with instructions encoded therein that, when executed, cause the microprocessor to carry out the tasks of the projectile detection circuit 330. In another embodiment, the projectile detection circuit 330 may be implemented as a custom circuit such as a field programmable gate array (FPGA) configured to carry out these tasks. In a further example, there are one or more memory units (such as non-volatile memory units) that is or are coupled to the processing component.

For example, the projectile detection circuit 330 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit (such as the projectile detection circuit 330) can be divided into two or more circuits (such as a VNIR/MWIR video fusion circuit 340, a horizon detection and image segmentation circuit 350, a near-horizon segment circuit 360, a clustering and shape analysis circuit 370, and a silo stack frame buffer circuit 380), each performing separate functions performed by the single circuit.

As will be further appreciated, a circuit as used herein is a physical structure capable of carrying out one or more functionalities as variously provided herein, whether the structure be hardware only such as purpose-built semiconductor (e.g., gate-level logic or application specific integrated circuit) or a printed circuit board populated with discrete components configured and arranged to carry out the various functionalities provided herein, or a processor-based system programmed with computer code or instructions that are executable by the processor-based system to carry out the various functionalities provided herein, or a combination of such hardware and software based architectures (e.g., printed circuit board with one or more embedded routines executable by one or more processors). Numerous such embodiments and configurations will be appreciated in light of this disclosure.

In further detail, in one or more embodiments, the projectile detection system 300 includes a camera system with multiple cameras. Some of the cameras sense different ranges of electromagnetic radiation. For example, in the projectile detection system 300 of FIG. 3, the camera system includes the VNIR video source 310 and the MWIR video source 320. In one such embodiment, each video source captures high definition video, such as 5120-6144 horizontal pixels by 4096-4200 vertical pixels, 16 bits per pixel resolution per band (e.g., blue, green, red, NIR, and MWIR) at 24 hertz (Hz), with 200-222 microradian (µrad) instantaneous field-of-view (IFOV) per pixel (e.g., approximately 78-87 pixels per azimuthal degree (°), or about 65-70° of azimuthal coverage per camera), using six of each camera type to provide 360° azimuthal coverage with overlap between adjacent cameras. In one such embodiment, the MWIR video source 320 has an additional horizon mode camera that captures 512 pixels of vertical resolution centered on the horizon at a higher frame rate, such as 72 Hz.

In some embodiments, the VNIR video source 310 and the MWIR video source 320 differ in both resolution and field of view. In some embodiments, one or more of the VNIR video source 310 and the MWIR video source 320 include multiple cameras, such as to extend the field of view by having different cameras cover different field of views. In some embodiments, projectile detection uses the output of both the VNIR video source 310 and the MWIR video source 320 for processing. In some embodiments, the VNIR video data is used for horizon detection in certain environmental conditions where the MWIR video data suffers. In some embodiments, the MWIR video source 320 is supplemented or replaced with an LWIR video source that performs a similar role. In some embodiments, the VNIR video source 310 and the MWIR video source 320 are one or more sets of paired cameras (one VNIR, one MWIR), each pair attached and aligned to a common frame to capture identical or near identical fields of view (or at least in their central portions).

In FIG. 3, the projectile detection circuit 330 includes the VNIR/MWIR video fusion circuit 340, the horizon detection and image segmentation circuit 350, the near-horizon segment circuit 360, the clustering and shape analysis circuit 370, and the silo stack frame buffer circuit 380. The output of the VNIR video source 310 and the MWIR video source 320 is input to the VNIR/MWIR video fusion circuit 340, to fuse the data from the two sources into a common format. In one such embodiment, the fused data includes five bands (e.g., blue, green, red, NIR, and MWIR), with the MWIR data scaled, rotated, and otherwise aligned and interpolated (e.g., with bicubic interpolation) to match the VNIR data pixel space. The fused data is input to the horizon detection and image segmentation circuit 350, which, in one embodiment, performs the technique of horizon detection and image segmentation 240 (e.g., range-slope calculation 242, Canny edge detection 244, Hough transform 246, and segmentation and mask creation 248) using one or more bands of the VNIR data along with the MWIR data.

The detected horizon and associated masks from the horizon detection and image segmentation circuit 350 are input to the near-horizon segment circuit 360 which, in one embodiment, performs the technique of near-horizon segment (projectile detection) 250 (e.g., image rotation, non-linear horizon correction, and row detrending 252, phase-only transform 254, convolution matched filters 256, and anomaly detection and SNR threshold 258) using the MWIR data. The suspect pixels from the near-horizon segment circuit 360 are input to the clustering and shape analysis circuit 370 which, in one embodiment, performs the technique of clustering and shape analysis 260 (e.g., R-tree cluster 262, shape analysis using range data 264, and filter shapes and create contact list and hits map 266). Azimuths, elevations, and SNRs (among other fields) of the selected clusters are generated (in the form of a frame contact list) for processing between multiple consecutive frames (e.g., silo stack frame buffer processing).

The frame contact list from the clustering and shape analysis circuit 370 is input to the silo stack frame buffer circuit 380 which, in one embodiment, performs the technique of the silo stack frame buffer 280 (e.g., the persistence and scintillation filter 285). The silo contact list from the silo stack frame buffer circuit 380 (e.g., those contacts with sufficient persistence and scintillation) is input to the tracking and cueing circuit 390 which, in one embodiment, performs the technique of tracking and cueing 290.

Methodology

FIGS. 4A-4D are flow diagrams of an example method 400 of projectile detection, such as for use with the projectile detection system 300 of FIG. 3, according to an embodiment of the present disclosure. More generally, the method 400 and other methods described herein may be implemented in hardware or combinations of hardware and software. For example, the method 400 may be implemented by the components or techniques of FIGS. 1-3. In another embodiment, the method 400 may be implemented by a custom circuit such as a multi-camera image data fuser with custom processing circuits (such as an FPGA) configured to carry out the method 400. In other embodiments, the method 400 may be performed in conjunction with a special purpose processor, such as a signal processor.

In some other embodiments, some or all of the method 400 may be implemented as a series of computer instructions, such as software, firmware, or a combination of the two, together with one or more computer processors (e.g., one or more microprocessors). The instructions, when executed on a given processor, cause portions of the method 400 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 400 (or other method described herein) to be carried out for projectile detection. In addition, while the methods described herein may appear to have a certain order to their operations, other embodiments may not be so limited. Accordingly, the order of the operations can be varied between embodiments, as would be apparent in light of this disclosure.

Referring to the method 400 of FIGS. 4A-4D, a visible imaging camera (such as VNIR camera 210) acquires 405 visible image data of a target scene (such as the sea and sky surrounding a ship) for frames including the current frame, while a thermal imaging camera (such as MWIR camera 212) acquires 405 thermal IR image data of the target scene for the frames. In addition, a processor-based system (such as projectile detection system 300) fuses 410 (such as VNIR/MWIR fusion 220) the visible image data and the thermal IR image data of the target scene for the current frame to create an unrotated image, identifies 415 (such as horizon detection and image segmentation 240) a horizon in the unrotated image, rotates 420 (such as image rotation 252) the unrotated image to create a target image by aligning the identified horizon in the horizontal direction.

The method 400 further includes equalizing 425 (such as non-linear horizon correction 252) the height of the horizon in the horizontal direction of the target image for the current frame, detrending 430 (such as non-linear horizon correction 252) the rows of the equalized horizon-height image, performing 435 (such as phase-only transform 254) a phase-only transform of the row-detrended image, convolving 440 (such as convolution matched filters 256) the phase-only transformed image with matched filters to spread projectile patterns appearing in the transformed image, generating 445 (such as anomaly detection and SNR threshold 258) a signal-to-noise ratio (SNR) for each pixel based on the convolved images, and identifying 445 (such as anomaly detection and SNR threshold 258) those pixels whose SNR exceeds an SNR threshold value.

The method 400 further includes clustering 450 (such as R-tree cluster 262) nearby identified pixels to generate a set of clusters of the current frame, assigning 455 (such as R-tree cluster 262) each cluster an azimuth and elevation for the current frame, and generating 460 (such as R-tree cluster 262) an SNR for each cluster for the current frame based on the SNRs of the identified pixels in the cluster. The method 400 further includes filtering 465 (such as shape analysis 264 and filter shapes and create contact list 266) the clusters based on shape characteristics matching those of missiles and other projectiles, repeating 470 (such as near-horizon segment 250 and clustering and shape analysis 260) the cluster generation for five or more unrotated images of a corresponding five or more frames to generate a corresponding five or more sets of projectile-shaped clusters, and identifying 475 (such as persistence filter 285) those projectile-shaped clusters as persistent, based on their corresponding azimuths and elevations over the five or more frames, if they appear three or more times in the five or more sets.

The method 400 further includes identifying 480 (such as scintillation filter 285) those persistent clusters as the projectile targets if the variance of their corresponding SNRs over the five or more frames exceeds an SNR variance threshold value, tracking 485 (such as tracking and cueing 290) the projectile targets over a longer period than the five or more frames, and cueing 490 (such as tracking and cueing 290) appropriate countermeasures for any of the tracked projectile targets that present a threat. Numerous other methods and techniques will be apparent in light of the present disclosure.

FURTHER EXAMPLE EMBODIMENTS

The following examples pertain to further embodiments, from which numerous permutations and configurations will be apparent.

Example 1 is a computer program product including one or more non-transitory machine-readable storage mediums having instructions encoded thereon that when executed by one or more processors, cause a process to be carried out for projectile detection, the process including: identifying a horizon in a target image including thermal infrared (IR) image data of a target scene for a current frame; rotating the target image to align the identified horizon in the horizontal direction; equalizing the height of the horizon in the horizontal direction of the rotated image; detrending the rows of the equalized horizon-height image; performing a phase-only transform of the row-detrended image; and identifying projectile targets from the phase-only transformed image.

Example 2 includes the computer program product of Example 1, the process further including initiating countermeasures based on the identified projectile targets.

Example 3 includes the computer program product of Example 1, the process further including fusing visible image data and the thermal IR image data of the target scene for the current frame to create the target image.

Example 4 includes the computer program product of Example 1, the process further including convolving the phase-only transformed image with matched filters to spread projectile patterns appearing in the transformed image.

Example 5 includes the computer program product of Example 4, the process further including generating a signal-to-noise ratio (SNR) for each pixel based on the convolved images, and identifying those pixels whose SNR exceeds an SNR threshold value.

Example 6 includes the computer program product of Example 5, the process further including: clustering nearby said identified pixels to generate a set of clusters of the current frame; assigning each cluster an azimuth and elevation for the current frame; and generating an SNR for each cluster for the current frame based on the SNRs of the identified pixels in the cluster. In some such cases, the process further includes filtering the clusters based on shape characteristics matching those of projectiles.

Example 7 includes the computer program product of Example 6, the process further including: repeating the process for five or more target images of a corresponding five or more frames to generate a corresponding five or more sets of clusters; identifying those clusters as persistent, based on their corresponding said azimuths and elevations over the five or more frames, if they appear three or more times in the five or more sets; and identifying those persistent clusters as the projectile targets if the variance of their corresponding said SNRs over the five or more frames exceeds an SNR variance threshold value.

Example 8 is a system for projectile detection, the system including: the computer program product of Example 1; and the one or more processors to execute the encoded instructions.

Example 9 is a projectile detection system including: an image rotating circuit to rotate a target image including thermal infrared (IR) image data of a target scene for a current frame, to align a horizon in the horizontal direction; a non-linear horizon correcting circuit to equalize the height of the horizon in the horizontal direction of the rotated image; a row detrending circuit to detrend the rows of the equalized horizon-height image; a phase-only transform circuit to perform a phase-only transform of the row-detrended image; and a point spread function circuit to convolve the phase-only transformed image with matched filters to spread projectile patterns appearing in the transformed image, wherein the projectile detection system is to identify projectile targets from the spread projectile patterns in the convolved images.

Example 10 includes the projectile detection system of Example 9, further including an image fusing circuit to fuse visible image data and the thermal IR image data of the target scene for the current frame to create the target image.

Example 11 includes the projectile detection system of Example 10, further including a visible imaging camera to acquire the visible image data and a thermal imaging camera to acquire the thermal IR image data of the target scene in frames including the current frame.

Example 12 includes the projectile detection system of Example 9, further including a horizon detecting circuit to identify the horizon in the target image before rotating the target image.

Example 13 includes the projectile detection system of Example 9, further including a signal-to-noise ratio (SNR) thresholding circuit to generate an SNR for each pixel based on the convolved images, and to identify those pixels whose SNR exceeds an SNR threshold value.

Example 14 includes the projectile detection system of Example 13, further including a clustering circuit to cluster nearby said identified pixels to generate a set of clusters of the current frame, to assign each cluster an azimuth and elevation for the current frame, and to generate an SNR for each cluster for the current frame based on the SNRs of the identified pixels in the cluster.

Example 15 includes the projectile detection system of Example 14, further including a shape filter circuit to filter the clusters based on shape characteristics matching those of projectiles.

Example 16 includes the projectile detection system of Example 14, further including: a frame repeating circuit to repeat the cluster generation for five or more target images of a corresponding five or more frames to generate a corresponding five or more sets of clusters; and a persistence filter circuit to identify those clusters as persistent, based on their corresponding said azimuths and elevations over the five or more frames, if they appear three or more times in the five or more sets.

Example 17 includes the projectile detection system of Example 16, further including: a scintillation filter circuit to identify those persistent clusters as the projectile targets if the variance of their corresponding said SNRs over the five or more frames exceeds an SNR variance threshold value; a tracking circuit to track the projectile targets over a longer period than the five or more frames; and a cueing circuit to cue appropriate countermeasures for any of the tracked projectile targets that present a threat.

Example 18 is a method of projectile detection, the method including: equalizing, by a processor-based system, the height of a horizon in the horizontal direction of a target image including thermal infrared (IR) image data of a target scene for a current frame; detrending, by the processor-based system, the rows of the equalized horizon-height image; performing, by the processor-based system, a phase-only transform of the row-detrended image; convolving, by the processor-based system, the phase-only transformed image with matched filters to spread projectile patterns appearing in the transformed image; generating, by the processor-based system, a signal-to-noise ratio (SNR) for each pixel based on the convolved images and identifying, by the processor-based system, those pixels whose SNR exceeds an SNR threshold value; and identifying, by the processor-based system, projectile targets from the identified pixels.

Example 19 includes the method of Example 18, further including: acquiring, by a visible imaging camera, visible image data of the target scene in frames including the current frame, and acquiring, by a thermal imaging camera, the thermal IR image data of the target scene in the frames; fusing, by the processor-based system, the visible image data and the thermal IR image data of the target scene for the current frame to create an unrotated image; identifying, by the processor-based system, the horizon in the unrotated image; and rotating, by the processor-based system, the unrotated image to create the target image by aligning the identified horizon in the horizontal direction.

Example 20 includes the method of Example 18, further including: clustering, by the processor-based system, nearby said identified pixels to generate a set of clusters of the current frame; assigning, by the processor-based system, each cluster an azimuth and elevation for the current frame; and generating, by the processor-based system, an SNR for each cluster for the current frame based on the SNRs of the identified pixels in the cluster.

Example 21 includes the method of Example 20, further including: filtering, by the processor-based system, the clusters based on shape characteristics matching those of projectiles; repeating, by the processor-based system, the cluster generation for five or more target images of a corresponding five or more frames to generate a corresponding five or more sets of projectile-shaped clusters; and identifying, by the processor-based system, those projectile-shaped clusters as persistent, based on their corresponding azimuths and elevations over the five or more frames, if they appear three or more times in the five or more sets.

Example 22 includes the method of Example 21, further including: identifying, by the processor-based system, those persistent clusters as the projectile targets if the variance of their corresponding SNRs over the five or more frames exceeds an SNR variance threshold value; tracking, by the processor-based system, the projectile targets over a longer period than the five or more frames; and cueing, by the processor-based system, appropriate countermeasures for any of the tracked projectile targets that present a threat.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A computer program product including one or more non-transitory machine-readable storage mediums having instructions encoded thereon that when executed by one or more processors, cause a process to be carried out for projectile detection, the process comprising:
   identifying a horizon in a target image comprising thermal infrared (IR) image data of a target scene for a current frame;
   rotating the target image to align the identified horizon in the horizontal direction;
   equalizing the height of the horizon in the horizontal direction of the rotated image;
   detrending the rows of the equalized horizon-height image;
   performing a phase-only transform of the row-detrended image; and
   identifying projectile targets from the phase-only transformed image.

2. The computer program product of claim 1, the process further comprising initiating countermeasures based on the identified projectile targets.

3. The computer program product of claim 1, the process further comprising fusing visible image data and the thermal IR image data of the target scene for the current frame to create the target image.

4. The computer program product of claim 1, the process further comprising convolving the phase-only transformed image with matched filters to spread projectile patterns appearing in the transformed image.

5. The computer program product of claim 4, the process further comprising generating a signal-to-noise ratio (SNR) for each pixel based on the convolved images, and identifying those pixels whose SNR exceeds an SNR threshold value.

6. The computer program product of claim 5, the process further comprising:
   clustering nearby said identified pixels to generate a set of clusters of the current frame;
   assigning each cluster an azimuth and elevation for the current frame;
   generating an SNR for each cluster for the current frame based on the SNRs of the identified pixels in the cluster; and
   filtering the clusters based on shape characteristics matching those of projectiles.

7. The computer program product of claim 6, the process further comprising:
   repeating the process for five or more target images of a corresponding five or more frames to generate a corresponding five or more sets of projectile-shaped clusters;
   identifying those projectile-shaped clusters as persistent, based on their corresponding said azimuths and elevations over the five or more frames, if they appear three or more times in the five or more sets; and
   identifying those persistent clusters as the projectile targets if the variance of their corresponding said SNRs over the five or more frames exceeds an SNR variance threshold value.

8. A system for projectile detection, the system comprising:
the computer program product of claim 1; and
the one or more processors to execute the encoded instructions.

9. A projectile detection system comprising:
an image rotating circuit to rotate a target image comprising thermal infrared (IR) image data of a target scene for a current frame, to align a horizon in the horizontal direction;
a non-linear horizon correcting circuit to equalize the height of the horizon in the horizontal direction of the rotated image;
a row detrending circuit to detrend the rows of the equalized horizon-height image;
a phase-only transform circuit to perform a phase-only transform of the row-detrended image; and
a point spread function circuit to convolve the phase-only transformed image with matched filters to spread projectile patterns appearing in the transformed image,
wherein the projectile detection system is to identify projectile targets from the spread projectile patterns in the convolved images.

10. The projectile detection system of claim 9, further comprising an image fusing circuit to fuse visible image data and the thermal IR image data of the target scene for the current frame to create the target image.

11. The projectile detection system of claim 10, further comprising a visible imaging camera to acquire the visible image data and a thermal imaging camera to acquire the thermal IR image data of the target scene for frames including the current frame.

12. The projectile detection system of claim 9, further comprising a horizon detecting circuit to identify the horizon in the target image before rotating the target image.

13. The projectile detection system of claim 9, further comprising a signal-to-noise ratio (SNR) thresholding circuit to generate an SNR for each pixel based on the convolved images, and to identify those pixels whose SNR exceeds an SNR threshold value.

14. The projectile detection system of claim 13, further comprising a clustering circuit to cluster nearby said identified pixels to generate a set of clusters of the current frame, to assign each cluster an azimuth and elevation for the current frame, and to generate an SNR for each cluster for the current frame based on the SNRs of the identified pixels in the cluster.

15. The projectile detection system of claim 14, further comprising a shape filter circuit to filter the clusters based on shape characteristics matching those of projectiles.

16. The projectile detection system of claim 14, further comprising:
a frame repeating circuit to repeat the cluster generation for five or more target images of a corresponding five or more frames to generate a corresponding five or more sets of clusters; and
a persistence filter circuit to identify those clusters as persistent, based on their corresponding said azimuths and elevations over the five or more frames, if they appear three or more times in the five or more sets.

17. The projectile detection system of claim 16, further comprising:
a scintillation filter circuit to identify those persistent clusters as the projectile targets if the variance of their corresponding said SNRs over the five or more frames exceeds an SNR variance threshold value;
a tracking circuit to track the projectile targets over a longer period than the five or more frames; and
a cueing circuit to cue appropriate countermeasures for any of the tracked projectile targets that present a threat.

18. A method of projectile detection, the method comprising:
equalizing, by a processor-based system, the height of a horizon in the horizontal direction of a target image comprising thermal infrared (IR) image data of a target scene for a current frame;
detrending, by the processor-based system, the rows of the equalized horizon-height image;
performing, by the processor-based system, a phase-only transform of the row-detrended image;
convolving, by the processor-based system, the phase-only transformed image with matched filters to spread projectile patterns appearing in the transformed image;
generating, by the processor-based system, a signal-to-noise ratio (SNR) for each pixel based on the convolved images and identifying, by the processor-based system, those pixels whose SNR exceeds an SNR threshold value; and
identifying, by the processor-based system, projectile targets from the identified pixels.

19. The method of claim 18, further comprising:
acquiring, by a visible imaging camera, visible image data of the target scene for frames including the current frame, and acquiring, by a thermal imaging camera, the thermal IR image data of the target scene for the frames;
fusing, by the processor-based system, the visible image data and the thermal IR image data of the target scene for the current frame to create an unrotated image;
identifying, by the processor-based system, the horizon in the unrotated image; and
rotating, by the processor-based system, the unrotated image to create the target image by aligning the identified horizon in the horizontal direction.

20. The method of claim 18, further comprising:
clustering, by the processor-based system, nearby said identified pixels to generate a set of clusters of the current frame;
assigning, by the processor-based system, each cluster an azimuth and elevation for the current frame; and
generating, by the processor-based system, an SNR for each cluster for the current frame based on the SNRs of the identified pixels in the cluster.

21. The method of claim 20, further comprising:
filtering, by the processor-based system, the clusters based on shape characteristics matching those of projectiles;
repeating, by the processor-based system, the cluster generation for five or more target images of a corresponding five or more frames to generate a corresponding five or more sets of projectile-shaped clusters; and
identifying, by the processor-based system, those projectile-shaped clusters as persistent, based on their corresponding azimuths and elevations over the five or more frames, if they appear three or more times in the five or more sets.

22. The method of claim 21, further comprising:
identifying, by the processor-based system, those persistent clusters as the projectile targets if the variance of their corresponding SNRs over the five or more frames exceeds an SNR variance threshold value;

tracking, by the processor-based system, the projectile targets over a longer period than the five or more frames; and cueing, by the processor-based system, appropriate countermeasures for any of the tracked projectile targets that present a threat.

* * * * *